(12) United States Patent
Yoon et al.

(10) Patent No.: US 8,635,076 B2
(45) Date of Patent: Jan. 21, 2014

(54) METHOD FOR SELECTING PROGRAM AND APPARATUS THEREOF

(71) Applicant: Samsung Electronics Co., Ltd., Suwon-si (KR)

(72) Inventors: Hyun-jin Yoon, Seoul (KR); Cheon-seong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/631,031

(22) Filed: Sep. 28, 2012

(65) Prior Publication Data

US 2013/0024200 A1    Jan. 24, 2013

Related U.S. Application Data

(63) Continuation of application No. 12/212,358, filed on Sep. 17, 2008, now Pat. No. 8,301,457.

(30) Foreign Application Priority Data

Jun. 9, 2008 (KR) .................. 10-2008-0053658

(51) Int. Cl.
*G10L 15/00* (2013.01)

(52) U.S. Cl.
USPC ..................... 704/275; 704/246; 704/251

(58) Field of Classification Search
USPC ............................................. 704/275
See application file for complete search history.

(56) References Cited

U.S. PATENT DOCUMENTS

| | | |
|---|---|---|
| 5,774,859 A | 6/1998 | Houser et al. |
| 2004/0181391 A1 | 9/2004 | Inoue et al. |
| 2008/0126092 A1 | 5/2008 | Kawazoe et al. |
| 2008/0167872 A1 | 7/2008 | Okimoto et al. |
| 2010/0318357 A1 | 12/2010 | Istvan et al. |

*Primary Examiner* — Daniel D Abebe
(74) *Attorney, Agent, or Firm* — Sughrue Mion, PLLC

(57) ABSTRACT

A program selection method and a display apparatus thereof are provided. The program selection method includes generating a program list including at least one program title, determining whether there is a voice input for a program selection; searching for a desired program title corresponding to the voice input for the program selection among the at least one program title in the program list, and selecting a program corresponding to the desired program title based on the searching for the desired program title.

22 Claims, 4 Drawing Sheets

TABLE FOR SEPARATING MAIN TITLE AND SUBTITLE

| PROGRAM TITLE | MAIN TITLE | SUBTITLE |
|---|---|---|
| LPGA Tour Golf ;Ginn Tribute | LPGA Tour Golf | Ginn Tribute |
| Ultimate Fighter ;Team Rampage VS Alabama | Ultimate Fighter | Team Rampage VS Alabama |

METHOD FOR SELECTING PROGRAM AND APPARATUS THEREOF

CROSS-REFERENCE TO RELATED PATENT APPLICATION

This application is a continuation of U.S. patent application Ser. No. 12/212,358 filed on Sep. 17, 2008, which claim priority from Korean Patent Application No. 10-2008-0053658, filed on Jun. 9, 2008 in the Korean Intellectual Property Office, the disclosures of which are incorporated herein in their entirety by reference.

BACKGROUND OF THE INVENTION

1. Field of the Invention

Methods and apparatuses consistent with the present invention relate to program selection, and more particularly to a program using a voice input.

2. Description of the Related Art

Digital broadcast types include a digital satellite broadcast, a digital cable broadcast, a digital terrestrial broadcast, etc. A digital broadcast receiving apparatus such as a set top box (STB) receives a Moving Picture Experts Group (MPEG) transport stream (TS) which includes a digital broadcast signal, retrieves a video signal and an audio signal from the MPEG TS, sends the retrieved video and audio signals to a display apparatus such as a television (TV) or a monitor, and reproduces a broadcast program of the video and audio signals.

Because digital broadcasts have more channels than conventional analog broadcasts, a user can enjoy more broadcast programs. However, there may be difficulty in choosing a broadcast program of a digital broadcast.

If a user already knows a channel number of a program the user wants to see, the user can view the program by simply selecting the channel number. However, if a user does not know the channel number of a program, the user can search channel by channel using buttons (e.g., up and down keys) of a remote controller or use an electronic program guide (EPG) to search for a program. Even in the case that a user uses the EPG, the user must manipulate the buttons of the remote controller to search for a program in the EPG which is also inconvenient to the user.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides a method selecting a program based on a voice input by adjusting a program title to voice recognition and an apparatus thereof.

According to an aspect of the invention, there is provided a program selection method comprising generating a program list comprising a program title, determining whether there is a voice input for a program selection, searching for a desired program title corresponding to the voice input in the program list if it is determined that there is the voice input for the program selection, and selecting a program corresponding to the desired program title based on the searching for the desired program.

According to another aspect of the invention, the program selection method may further comprise generating a recognition list which comprises a recognition source corresponding to the voice input and is matched with the program list.

According to another aspect of the invention, the recognition source may consist of a word or a combination of words included in the program title.

According to another aspect of the invention, the generating the recognition list may comprise generating the recognition source using a main title if the desired program title in the program list consists of the main title and a subtitle.

According to another aspect of the invention, the searching for the desired program title may comprise searching for the recognition source corresponding to the voice input in the recognition list and searching for the desired program title matched with the recognition source in the program list.

According to another aspect of the invention, if there is a plurality of the program titles corresponding to the voice input, the searching for the desired program title may further comprise providing a plurality of the program titles.

According to another aspect of the invention, the selecting the program may comprise determining whether there is another voice input for the program selection while information about the plurality of the program titles is provided and selecting another program title, which corresponds to the another voice input, from among the plurality of the program titles.

According to another aspect of the invention, the determining whether there is the voice input may comprise determining whether a voice recognition mode has been selected and if the voice recognition mode has been selected, determining whether the voice input in a voice recognition mode is received.

According to another aspect of the invention, the program title may be included in a broadcast signal.

According to another aspect of the invention, the generating of the program list may be performed based on the extracting of the at least one program title.

According to another aspect of the invention, the recognition list may be matched with the program list such that at least one recognition source in the recognition list is matched with at least one program title in the program list.

According to another aspect of the invention, the voice input may be received from a microphone.

According to another aspect of the invention, there is provided an broadcast receiving apparatus comprising a list generating unit which generates a program list comprising at least one program title; and a control unit which determines whether there is a voice input for a program selection, searches for a desired program title corresponding to the voice input in the program list, if it is determined that there is the voice input for the program selection and selects a program corresponding to the searched program title.

According to another aspect of the invention, the list generating unit may generate a recognition list which comprises a recognition source corresponding to the voice input and is matched with the program list.

According to another aspect of the invention, the recognition source may consist of a word or a combination of words included in the desired program title.

According to another aspect of the invention, the list generating unit may generate the recognition source using a main title if the desired program title in the program list consists of the main title and a subtitle.

According to another aspect of the invention, the control unit may search for the recognition source corresponding to the voice input in the recognition list and searches for the desired program title, which is matched with the recognition source in the program list.

According to another aspect of the invention, if there is the plurality of the program titles corresponding to the voice input, the control unit may display the plurality of program titles.

According to another aspect of the invention, the control unit may determine whether there is another voice input for the program selection while information about the plurality of the program titles is provided and selects another program title, which corresponds to the other voice input, from among the plurality of the program titles.

According to another aspect of the invention, the control unit may determine that there is the voice input for the program selection if a voice recognition mode has been selected, and if the voice recognition mode has been selected, the control unit determines whether the voice input is received.

According to another aspect of the invention, the broadcast receiving apparatus may further comprise a program extracting unit which extracts the at least one program title from a broadcast signal.

According to another aspect of the invention, the program extracting unit may extract the at least one program title from broadcast guide information including in the broadcast signal.

According to another aspect of the invention, the list generating unit may receive the at least one program title from the program extracting unit.

According to another aspect of the invention, the control unit may match the recognition list with the program list such that the at least one recognition source in the recognition list is matched with the at least one program title in the program list.

BRIEF DESCRIPTION OF THE DRAWINGS

The above and other aspects and features of the present invention will be apparent from the following detailed description of exemplary embodiments taken in conjunction with the accompanying drawings, in which.

DETAILED DESCRIPTION OF EXEMPLARY EMBODIMENTS OF THE INVENTION

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are merely provided to assist those of ordinary skill in the art in a comprehensive understanding of the invention.

Figure 1:
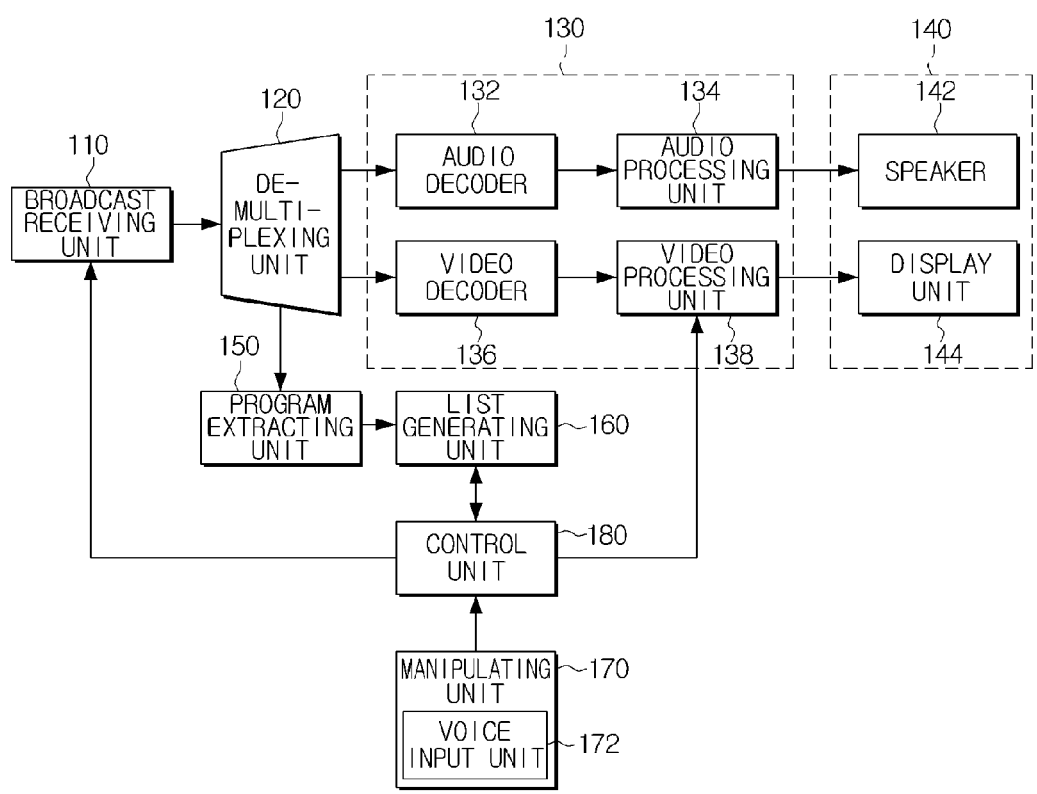
FIG. 1 illustrates a block diagram of a broadcast receiving apparatus according to an exemplary embodiment of the present invention.

FIG. 1 illustrates a block diagram of a broadcast receiving apparatus, which is a kind of display apparatus according to an exemplary embodiment of the present invention. Referring to FIG. 1, the broadcast receiving apparatus includes a broadcast receiving unit 110, a de-multiplexing unit 120, a signal processing unit 130, a signal output unit 140, a program extracting unit 150, a list generating unit 160, a manipulating unit 170, and a control unit 180.

The broadcast receiving unit 110 receives a broadcasting signal from an external source. A digital broadcasting signal is transmitted as an MPEG TS type which includes packets generated by time-division multiplexing a video signal, an audio signal, and various kinds of data signals.

The de-multiplexing unit 120 separates the received broadcast signal in the broadcast receiving unit 110 into the video signal, the audio signal, and the various kinds of data signals and sends the video signal and the audio signal to the signal processing unit 130 and the data signals to the program extracting unit 150.

The signal processing unit 130 includes an audio decoder 132 which decodes the separated audio signal output by the de-multiplexing unit 120, an audio processing unit 134 which processes the decoded audio signal output by the audio decoder 132, an video decoder 136 which decodes the separated video signal output by the de-multiplexing unit 120, and an video processing unit 138 which processes the decoded video signal output by the video decoder 136.

The signal output unit 140 includes a speaker 142 which outputs the processed audio signal output by the audio processing unit 134 and a display unit 144 which displays the processed video signal output by the video processing unit 138.

The program extracting unit 150 extracts titles of reproducible programs from the separated data signals through the de-multiplexing unit 120. The separated data signals include Program Specific Information (PSI) and additional information data such as program guide information.

The PSI is necessary information for performing basic operations of the broadcast receiving apparatus. The PSI includes a Program Association Table (PAT), a Conditional Access Table (CAT), and a Program Management Table (PMT). The additional information includes information to guide a program. A Network Information Table (NIT), a Service Description Table (SDT), a Time Date Table (TDT), and an Event Information Table (EIT) are examples of the additional information.

It is desirable for the program extracting unit 150 to extract the titles of the reproducible programs from the program guide information. The program extracting unit 150 may generate the EPG information using the PSI and the program guide information and may extract the titles of the reproducible programs from the EPG information.

The list generating unit 160 generates a program list using the extracted program titles output by the program extracting unit 150. To apply a voice recognition function, the list generating unit 160 generates a recognition list including titles of programs which are objects of voice recognition. Hereinafter, the programs which are objects of voice recognition are referred to as 'recognition sources'.

In generating the recognition list, the list generating unit 160 generates the recognition sources by eliminating unnecessary words, such as special characters and abbreviations, among the program titles in the program list and by using a word or combination of words which enable the program titles to be identified. If the program title comprises a subtitle which changes whenever the program is broadcasted and a main title is maintained whenever the program is broadcasted, it is desirable to generate the recognition source using only the main title. The list generating unit 160 generates the recognition list which comprises the recognition source generated in this way.

The list generating unit 160 matches a program title in the program list with a recognition source in the recognition list, and makes the program title correspond to the recognition source to be searched. The matching between the program title and the recognition source is not limited one-by-one. For example, one program title may match a plurality of recognition sources and one recognition source may match a plurality of program titles.

The manipulation unit 170 generates a predetermined command according to a user's input or manipulation. It is desirable for the manipulation unit 170 to comprise a voice input unit 172 which is a unit for voice input, such as a microphone.

The control unit 180 controls overall operations of the broadcast receiving apparatus. If there is a program selection command using a voice input, the control unit 180 searches whether the recognition source corresponding to the voice input is included in the recognition list. If the recognition source corresponding to the voice input is included in the recognition list, the control unit 180 searches for a program title which matches the recognition source, and controls function blocks in the broadcast receiving apparatus to select and reproduce a program corresponding to the searched program title.

If there is one program title that corresponds to the recognition source, the control unit 180 controls the function blocks in the broadcast receiving apparatus to select and reproduce a program corresponding to the program title without an additional command. However, if there are a plurality of program titles that correspond to the recognition source, the control unit 180 controls function blocks in the broadcast receiving apparatus to generate a list of the plurality of program titles and to display the generated list on the display unit 144. If there is an additional voice input for selecting a program title in the list, the control unit 180 controls the function blocks in the broadcast receiving apparatus to reproduce the selected program.

Figure 2:
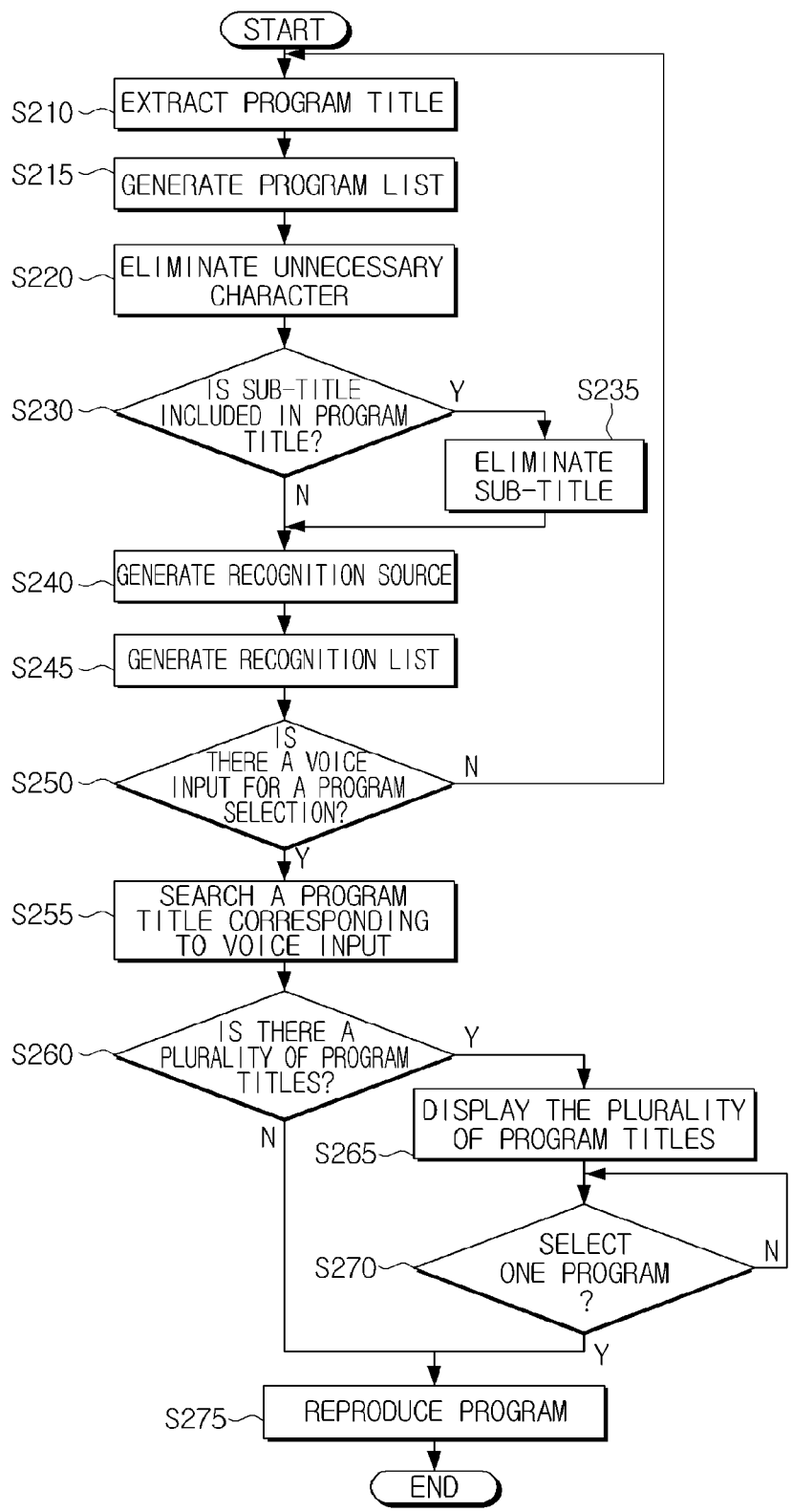
FIG. 2 illustrates a flow chart of a method of selecting a program using a voice input according to an exemplary embodiment of the present invention.

FIG. 2 illustrates a flow chart of method of selecting a program using a voice input according to an exemplary embodiment of the present invention.

The program extracting unit 150 extracts program titles from a broadcast signal (S210). In detail, if the broadcast signal is received and a data signal is separated from the broadcast signal by the de-multiplexing unit 120, the program extracting unit 150 extracts the program titles from broadcast guide information included in the data signal.

The list generating unit 160 generates a program list using the extracted program titles (S215). Generally, a program title, a broadcast time, information indicating whether this is a rebroadcast, etc., are included in the broadcast guide information. However, titles of programs which are on the air, in the broadcast guide information are used in an exemplary embodiment of the present invention.

The list generating unit 160 eliminates an unnecessary character(s), which can not indentify a program, such as a special character and an abbreviation (S220). Special characters such as !, ', &, /, <, > or abbreviations such as HD, DVS which represent additional character of the program are examples of the unnecessary characters. It is desirable to eliminate the unnecessary characters when generating the recognition list, since voice recognition of the unnecessary characters is impossible or a user does not speak the unnecessary character.

The list generating unit 160 determines whether a subtitle is included in the program title (S230). The subtitle is a program title which is added whenever the program is broadcasted. Generally, a user does not recognize the subtitle before the user watches the program.

If a subtitle is included in the program title (S230-Y), the list generating unit 160 eliminates the subtitle (S235).

The list generating unit 160 separates the program title or the program main title by word basis and generates a recognition source (S240), and generates a recognition list using the recognition source (S245). It is desirable for the recognition source to comprise a word or a combination of words used in the program title or the program main title.

The control unit 180 determines whether there is a voice input for a program selection (S250). If there is a voice input through the manipulation unit 170 when the broadcast receiving apparatus is in a voice mode, it is desirable for the control unit 180 to determine the voice input as the voice input for a program selection.

If it is determined that there is a voice input for a program selection (S250-Y), the control unit 180 searches for a program title corresponding to the voice input (S255).

In detail, the control unit 180 determines, using the recognition list, whether there is a recognition source corresponding to the voice input, and searches for a program title matched with the recognition source if it is determined that there is the recognition source corresponding to the voice input.

The control unit 180 determines whether there is a plurality of program titles matched with the recognition source (S260). If there is a plurality of program titles matched with the recognition source (S260-Y), the control unit 180 controls function blocks of the broadcast receiving apparatus to display the plurality of program titles on the display unit 144 (S265).

A user selects a program title among the plurality of program titles displayed on the display unit 144 using a voice input (S270). The program corresponding to the selected program title is reproduced (S275).

If there is only one program title matched with the recognition source (S260-N), the control unit 180 controls function blocks of the broadcast receiving apparatus to reproduce the program corresponding to the program title.

Figures 3, 4:
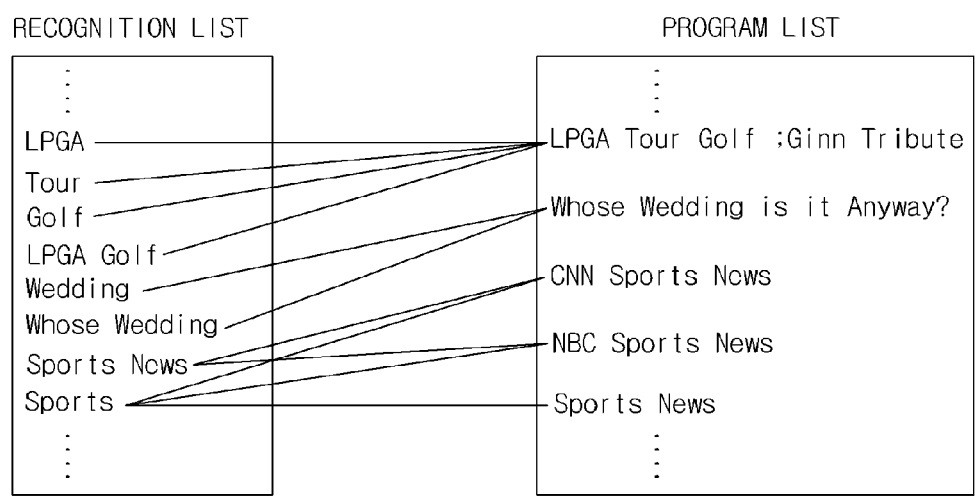
FIG. 3 illustrates a table for separating a main title and a subtitle according to an exemplary embodiment of the present invention.
FIG. 4 illustrates a matching relation between a recognition list and a program list according to an exemplary embodiment of the present invention.

FIG. 3 illustrates a table for separating a main title and a subtitle when the program title consists of a main title and a subtitle according to an exemplary embodiment of the present invention.

Referring to FIG. 3, in the program title 'LPGA Tour Golf: Ginn Tribute', 'LPGA Tour Golf' is a main title and 'Ginn Tribute' is a subtitle. In the case where a program title consists of a main title and a subtitle, the list generating unit 160 generates a recognition source using the main title 'LPGA Tour Golf'.

FIG. 4 illustrates a matching relation between a recognition list and a program list according to an exemplary embodiment of the present invention. Referring to FIG. 4, the program titles extracted by the program extracting unit 150 are 'LPGA Tour Golf: Ginn Tribute', 'Whose Wedding is it Anyway?', 'CNN Sports News', etc. The list generating unit 160 generates a program list using the program titles extracted by the program extracting unit 150. The list generating unit 160 eliminates among the program titles unnecessary characters such as special characters and abbreviations which represents an additional character of the program, generates recognition sources such as 'LPGA', 'Tour', 'Golf', 'LPGA Golf', 'Wedding' by separating the program titles, by word basis, in which the unnecessary characters are eliminated, and generates a recognition list. The list generating unit 160 matches recognition sources in the recognition list with program titles in the program list.

If a user inputs a voice of 'LPGA', 'Tour', 'Golf' or 'LPGA Golf', the control unit 180 recognizes the voice input as a selection for the program 'LPGA Tour Golf: Ginn Tribute' and controls function blocks in the broadcast receiving apparatus to reproduce the program. If a user inputs a voice 'Sports', the control unit 180 searches program titles 'CNN Sports News', 'NBC Sports News', and 'Sports Sports' which correspond to the voice 'Sports', in the program list and displays the program lists on the display unit 144. If a user inputs a voice 'Sports Sports' among the program titles displayed on the display unit 144, the control unit 180 controls function blocks in the broadcast receiving apparatus to reproduce the program 'Sports Sports'.

For a user is able to select a program to see by speaking a part or full title of the program, exemplary embodiments of the present invention provides a user convenience. Especially, for a user is able to select a program to see by speaking only a part of a program title, this method may be more convenient than selecting a program using a remote controller.

The exemplary embodiments of the present invention show the case where a broadcast program is selected by a voice input. This invention is not limited to the exemplary embodiments. This invention may be applied to the case of reproducing contents of external device connected to a display apparatus too.

Although an apparatus which is able to receive a broadcast has been described as a display apparatus to which the present invention is applicable, there is no limitation at the kind of a display apparatus in which the present invention is applicable. The present invention may be applied to a display apparatus such as a TV, a STB, a digital video disc (DVD) player, a DVD recorder, a video cassette recorder (VCR), a multimedia player, a moving image player, a compact disc (CD) player, a CD recording device, a MP3 displayer, a mobile phone, and a personal digital assistant (PDA), and a selective combination of the display apparatuses.

Figure 5:
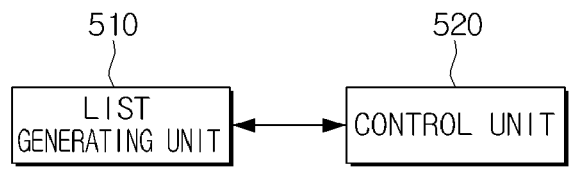
FIG. 5 illustrates a block diagram of a display apparatus according to an exemplary embodiment of the present invention.

FIG. 5 illustrates a block diagram of a display apparatus according to an exemplary embodiment of the present invention. The display apparatus includes a list generating unit 510 and a control unit 520.

The list generating unit 510 generates a program list including program titles. If it is determined that there is a voice input for a program selection, the control unit 520 searches for a program title corresponding to the voice input in the program list and selects a program corresponding to the searched program title.

Figure 6:
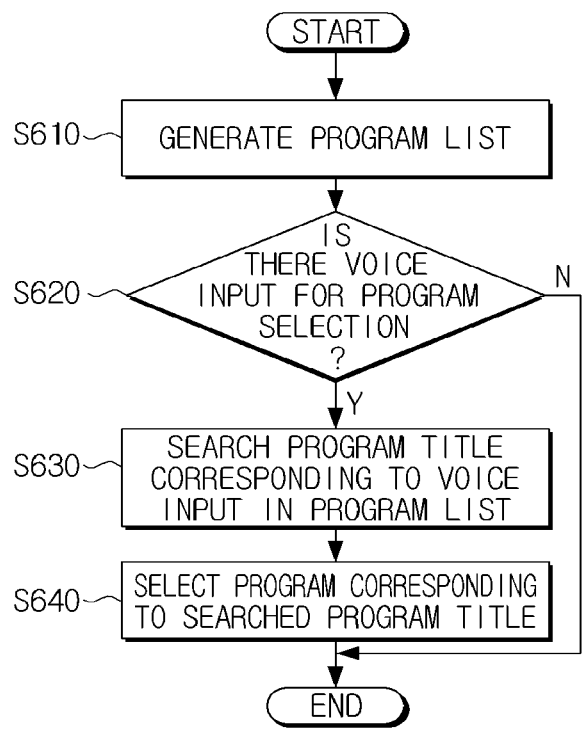
FIG. 6 illustrates a flow chart of a program selection method according to an exemplary embodiment of the present invention.

FIG. 6 illustrates a flow chart of a program selection method according to an exemplary embodiment of the present invention.

Referring to FIG. 6, the list generating unit 510 generates a program list including program titles (S610). The control unit 520 determines whether there is a voice input for a program selection (S620). If it is determined that there is a voice input for a program selection (S620-Y), the control unit 520 searches for a program title corresponding to the voice input in the program list (S630), and selects a program corresponding to the searched program title (S640).

As it is mentioned above, for a program title is adjusted to a voice input according to exemplary embodiments of the present invention, a user may select the program easily.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A program selection method comprising:
    determining whether there is a voice input for a program selection;
    searching for a desired program title corresponding to the voice input; and
    selecting a program corresponding to the desired program title based on the searching for the desired program title,
    wherein if there is a plurality of the program titles corresponding to the voice input, the searching for the desired program title comprises displaying the plurality of the program titles, and
    wherein the selecting the program comprises determining whether there is another voice input for the program selection while the plurality of the program titles is displayed and selecting another program title, which corresponds to the other voice input, from among the plurality of the program titles.

2. The program selection method of claim 1, wherein the determining whether there is the voice input comprises determining whether a voice recognition mode has been selected and if the voice recognition mode has been selected, determining whether the voice input is received.

3. The program selection method of claim 1, further comprising extracting the at least one program title from a broadcast signal.

4. The program selection method of claim 3, wherein the extracting the at least one program title comprises extracting the at least one program title from broadcast guide information included in the broadcast signal.

5. The program selection method of claim 1, wherein the voice input is received from a microphone.

6. A program selection method comprising:
    determining whether there is a voice input for a program selection;
    searching for a desired program title corresponding to the voice input; and
    selecting a program corresponding to the desired program title based on the searching for the desired program title,
    further comprising generating a recognition list which comprises a recognition source corresponding to the voice input and is matched with a program list,
    wherein the recognition source comprises a word or a combination of words included in the desired program title, and
    wherein the generating the recognition list comprises generating the recognition source using only a main title if the desired program title in the program list comprises the main title and a subtitle.

7. The program selection method of claim 6, wherein the searching for the desired program title comprises searching the recognition source corresponding to the voice input in the recognition list and searching for the desired program title, which is matched with the recognition source in the program list.

8. The program selection method of claim 7, wherein the generating of the program list is performed based on the extracting of the at least one program title.

9. The program selection method of claim 6, wherein the recognition list is matched with the program list such that at least one recognition source in the recognition list is matched with at least one program title in the program list.

10. The program selection method of claim 6, wherein the generating the recognition list further comprises eliminating punctuation marks from the main title.

11. The program selection method of claim 6, wherein the generating the recognition list further comprises eliminating abbreviations from the main title.

12. A broadcast receiving apparatus comprising:
a control unit which determines whether there is a voice input for a program selection, searches in a program list for a desired program title corresponding to the voice input for the program selection among the at least one program title if it is determined that there is the voice input for the program selection, and selects a program corresponding to the desired program title based on the search for the desired program title,
wherein if there is a plurality of the program titles corresponding to the voice input, the control unit displays the plurality of the program titles,
wherein the control unit determines whether there is another voice input for the program selection while the plurality of the program titles is displayed and selects another program title, which corresponds to the other voice input, from among the plurality of the program titles.

13. The broadcast receiving apparatus of claim 12, wherein the control unit determines there is the voice input for the program selection if a voice recognition mode has been selected, and if the voice recognition mode has been selected, the control unit determines whether the voice input is received.

14. The broadcast receiving apparatus of claim 12, further comprising a program extracting unit which extracts the at least one program title from a broadcast signal.

15. The broadcast receiving apparatus of claim 14, wherein the program extracting unit extracts the at least one program title from broadcast guide information included in the broadcast signal.

16. The broadcast receiving apparatus of claim 15, wherein the control unit eliminates abbreviations from the main title when generating the recognition source.

17. The broadcast receiving apparatus of claim 14, wherein the control unit receives the at least one program title from the program extracting unit.

18. The broadcast receiving apparatus of claim 12, wherein the voice input is received from a microphone.

19. A broadcast receiving apparatus comprising:
a control unit which determines whether there is a voice input for a program selection, searches in a program list for a desired program title corresponding to the voice input for the program selection among at least one program title if it is determined that there is the voice input for the program selection, and selects a program corresponding to the desired program title based on the search for the desired program title,
wherein the control unit generates a recognition list which comprises a recognition source corresponding to the voice input and is matched with the program list,
wherein the recognition source comprises a word or a combination of words included in the desired program title, and
wherein the control unit generates the recognition source using only a main title if the desired program title in the program list comprises the main title and a subtitle.

20. The broadcast receiving apparatus of claim 19, wherein the control unit searches for the recognition source corresponding to the voice input in the recognition list and searches for the desired program title, which is matched with the recognition source in the program list.

21. The program selection method of claim 19, wherein control unit matches the recognition list with the program list such that the at least one recognition source in the recognition list is matched with the at least one program title in the program list.

22. The broadcast receiving apparatus of claim 19, wherein the control unit eliminates punctuation marks from the main title when generating the recognition source.

* * * * *